United States Patent [19]

Ahmed

[11] Patent Number: 5,091,950
[45] Date of Patent: Feb. 25, 1992

[54] ARABIC LANGUAGE TRANSLATING DEVICE WITH PRONUNCIATION CAPABILITY USING LANGUAGE PRONUNCIATION RULES

[76] Inventor: Moustafa E. Ahmed, Dept. of Electrical Engineering, Worcester Polytechnic Institute, Worcester, Mass. 01609

[21] Appl. No.: 291,309

[22] Filed: Dec. 28, 1988

Related U.S. Application Data

[63] Continuation of Ser. No. 713,243, Mar. 18, 1985, abandoned.

[51] Int. Cl.⁵ .......................... G10L 5/02; G06F 15/38
[52] U.S. Cl. ......................................... 381/51; 364/419
[58] Field of Search .................. 340/825.19, 825.82; 400/111; 381/51, 52, 53, 47; 364/200, 900, 513.5, 419

[56] References Cited

U.S. PATENT DOCUMENTS

| | | | |
|---|---|---|---|
| 3,828,446 | 6/1974 | Mandel | 35/35 C |
| 3,938,099 | 3/1976 | Hyder | 364/900 X |
| 3,983,639 | 12/1976 | Podkopaev et al. | 35/9 A |
| 4,060,848 | 1/1977 | Hyatt | 364/200 |
| 4,144,656 | 10/1979 | Podkopaev et al. | 35/9 A |
| 4,158,236 | 11/1979 | Levy | 364/900 |
| 4,170,834 | 2/1979 | Smart | 35/35 C |
| 4,176,974 | 4/1979 | Bishai et al. | 400/111 |
| 4,193,119 | 5/1980 | Arase et al. | 364/900 |
| 4,215,240 | 7/1980 | Ostrowski | 340/825.19 |
| 4,218,760 | 5/1980 | Levy | 364/900 |
| 4,238,893 | 1/1980 | Komatsubara | 434/315 |
| 4,286,329 | 8/1981 | Goertzez | 400/111 |
| 4,310,317 | 6/1982 | Nomura et al. | 434/319 |
| 4,337,375 | 6/1982 | Freeman | 179/15 A |
| 4,355,370 | 5/1982 | Yanagiuchi | 364/900 |
| 4,365,244 | 12/1982 | Gillessen et al. | 340/825.82 |
| 4,380,438 | 4/1983 | Okamoto | 434/157 |
| 4,381,551 | 1/1983 | Kanou et al. | 364/900 |
| 4,417,319 | 12/1983 | Morimoto et al. | 364/900 |
| 4,438,505 | 11/1984 | Yanagiuchi et al. | 364/900 |
| 4,458,238 | 7/1984 | Learn | 340/825.19 |
| 4,484,305 | 10/1984 | Ho | 364/900 |
| 4,489,396 | 6/1984 | Hashimoto et al. | 364/900 |
| 4,503,514 | 3/1985 | Urquhart | 364/900 |
| 4,507,734 | 3/1985 | Kaldas | 364/900 |
| 4,542,478 | 9/1985 | Hashimoto | 364/900 |
| 4,562,432 | 12/1985 | Sremac | 340/825.19 |
| 4,567,573 | 4/1986 | Hashimoto et al. | 364/900 |
| 4,573,134 | 2/1986 | Ikemoto | 381/51 |
| 4,584,667 | 6/1986 | Hashimoto et al. | 364/900 |
| 4,593,356 | 7/1986 | Hashimoto et al. | 364/419 |
| 4,636,977 | 1/1987 | Ikemot et al. | 364/900 |
| 4,661,915 | 4/1987 | Ott | 381/41 |
| 4,670,842 | 6/1987 | Metwaly | 400/111 |
| 4,686,644 | 8/1987 | Renner | 381/51 |
| 4,733,368 | 3/1988 | Morimoto et al. | 365/419 |
| 4,758,977 | 7/1988 | Morimoto et al. | 364/419 |

FOREIGN PATENT DOCUMENTS 2014765  8/1979  United Kingdom .

OTHER PUBLICATIONS

B. S. Atal and S. L. Hanauer, "Speech Analysis and Synthesis by Linear Prediction of the Speech Wave",
(List continued on next page.)

Primary Examiner—Lawrence L. Anderson
Attorney, Agent, or Firm—Norman S. Blodgett; Gerry A. Blodgett

[57] ABSTRACT

A device capable of words/sentences translation from Arabic languages (Arabic, Urdu and Persian) to another language and vice-versa. The device discloses word pronunciation means which incorporate a sound synthesis means, a storage means for coded allophones and firmware means for language pronunciation rules. The invention discloses a data structure means and input means that eliminates the need for alphabetic keyboards. The device discloses a display means for words, modifiers, and explanatory abbreviations to categorize words. The invention also discloses a variable-width dot-matrices means for Arabic letters/modifiers generation. In one embodiment, the device contains a single chip microcomputer, a liquid crystal dot matrix display, a voice synthesis processor, a six-key operation keyboard and a solid state memory module for Arabic-English and English-Arabic translation.

4 Claims, 21 Drawing Sheets

OTHER PUBLICATIONS

Journal of the Acoustic Society of America, vol. 50, pp. 637-655, Aug. 1971.

L. Brantingham, "Single Chip Speech Synthesizer and Companion 131K bit ROM", IEEE Transactions on CONSUMER ELECTRONICS, vol. CE-25, No. 2, pp. 193-197, May 1979.

H. S. Elovitz, R. Johnson, A. McHugh and J. E. Shore, "Letter-To-Sound Rules for Automatic Translation of English Text to Phonetics", IEEE Transactions on ACOUSTICS, SPEECH, AND SIGNAL PROCESSING, vol. ASSP-24, No. 6, pp. 446-459, Dec. 1976.

Kun-Shan Lin, K. M. Goodie, G. A. Frantz, and G. L. Brantingham, "Text-To-Speech Using LPC Allophone Stringing", IEEE Transactions on CONSUMER ELECTRONICS, vol. CE-27, pp. 144-150, May 1981.

S. R. Hertz, "SRS TEXT-TO-PHONEME Rules: A Three-Level Rule Strategy", Proceedings of IEEE International Conference on Acoustics, Speech, and Signal Processsing, Atlanta, Mar. 1981.

Kun-Shan Lin, K. M. Goodie, G.A. Frantz, "Software Rules Give Personal Computer Real Word Power", ELECTRONICS, Feb. 10, 1981.

Janet G. May, "Speech Synthesis Using Allophones", Speech Technology, Apr. 1982.

G. Benbassat and D. Serain, "A Vocal Editor", IEEE Transactions on CONSUMER ELECTRONICS, vol. CE-29, No. 3, pp. 226-232, Aug. 1983.

G. Kapala and B. J. Lerner, "Realism in Synthetic Speech", IFEE SPECTRUM, APR. 1985.

*General Instrument SP:256-AL2 Allophone Speech Synthesis Manual,* GENERAL INSTRUMENT, 1988.

"Products That Talk. The Man-Machine Interface Will Never Be the Same", A TEXAS INSTRUMENT Ad. in Electronics, 1981.

"We Bring You Freedom of Speech" a GENERAL INSTRUMENT Ad. in Electronics, Mar. 24, 1982.

"Speech Recognition and Synthesis on a Single Chip", GENERAL INSTRUMENT Brochure in 1984.

"1984 Microelectronics Product Portfolio", p. 8, GENERAL INSTRUMENT, 1984.

Pages From "VX2 Reference Manual", a PC Based Speech Editing Laboratory By Adisa Corporation, P.O. Box 1364, Palo Alto, CA 94302. This Speech Editing Lab Was Used to Develop Arabic Speech in 1984.

A Brochure of a Speech Development System by TELLINNOVATION Was Also Available in the U.S. Market During 1984.

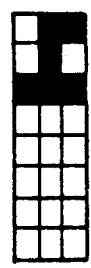 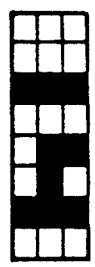   
FIG. 3.1   FIG. 3.2   FIG. 3.3   FIG. 3.4   FIG. 3.5
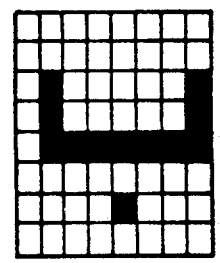 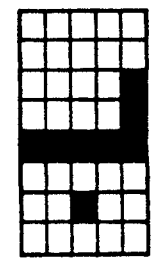 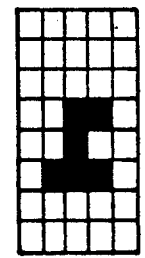
FIG. 3.6   FIG. 3.7   FIG. 3.8
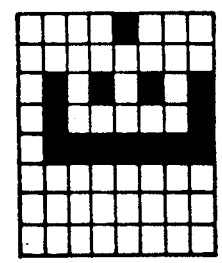 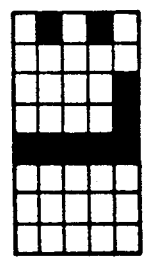 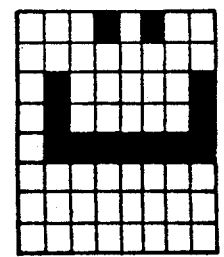
FIG. 3.9   FIG. 3.10   FIG. 3.11
FIG. 3.1 TO 3.11

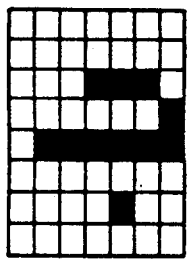
FIG. 3.12
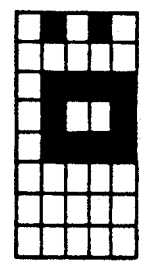
FIG. 3.13
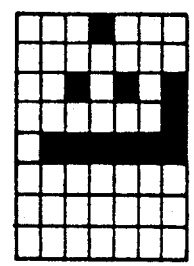
FIG. 3.14
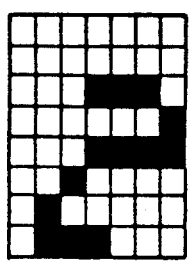
FIG. 3.15
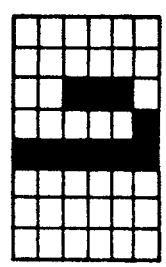
FIG. 3.16
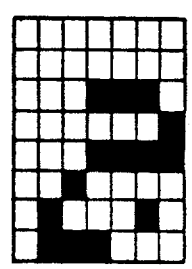
FIG. 3.17
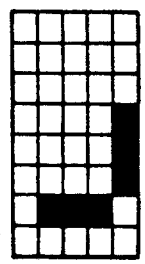
FIG. 3.18
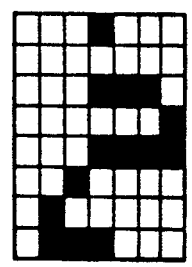
FIG. 3.19
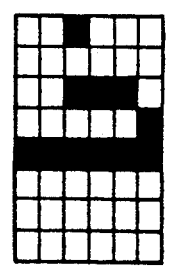
FIG. 3.20
FIG. 3.12 TO 3.20

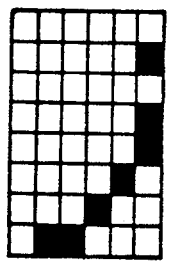
FIG. 3.21
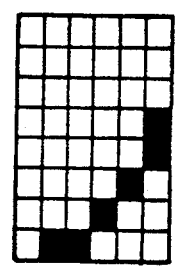
FIG. 3.22
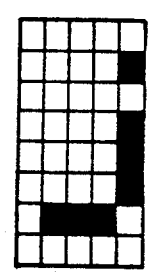
FIG. 3.23
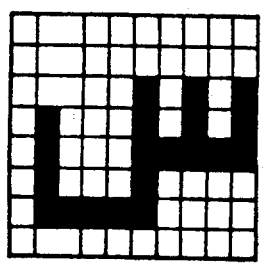
FIG. 3.24
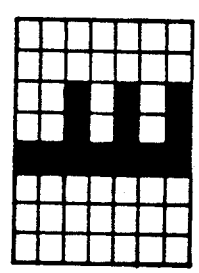
FIG. 3.25
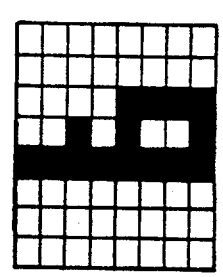
FIG. 3.26
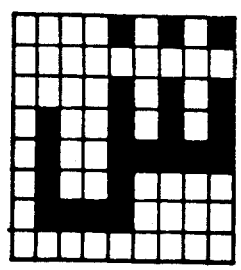
FIG. 3.27
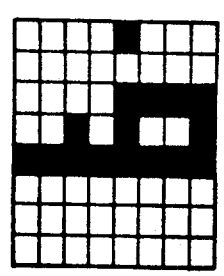
FIG. 3.28
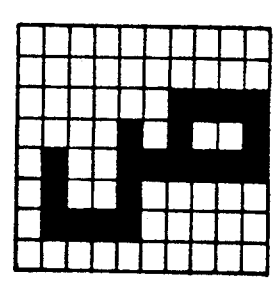
FIG. 3.29
FIG. 3.21 TO 3.29

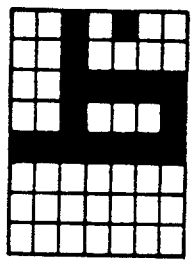
FIG. 3.30
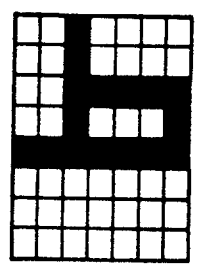
FIG. 3.31
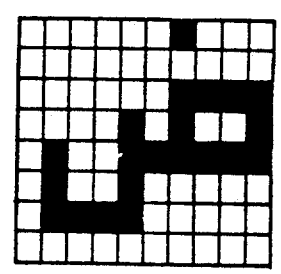
FIG. 3.32
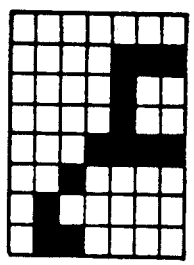
FIG. 3.33
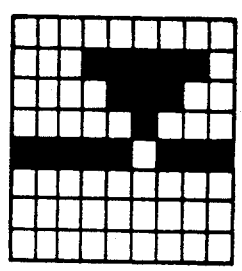
FIG. 3.34
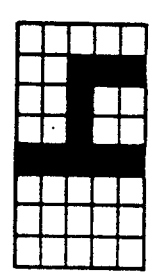
FIG. 3.35
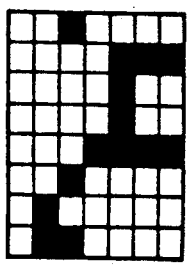
FIG. 3.36
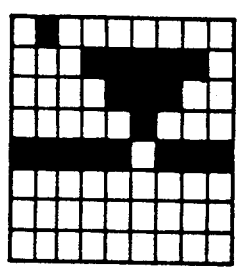
FIG. 3.37
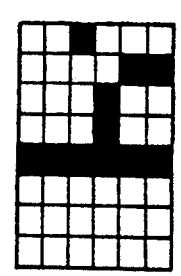
FIG. 3.38
FIG. 3.30 TO 3.38

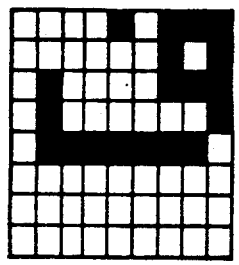
FIG. 3.39
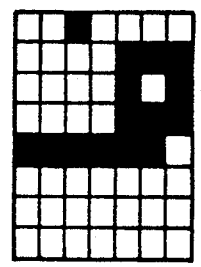
FIG. 3.40
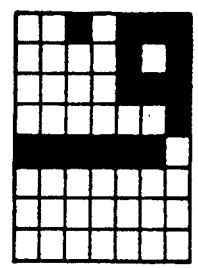
FIG. 3.41
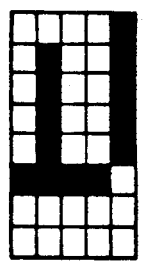
FIG. 3.42
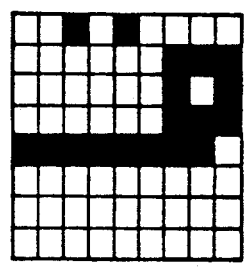
FIG. 3.43
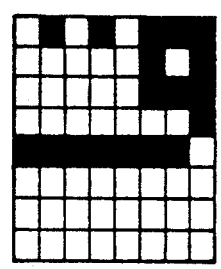
FIG. 3.44
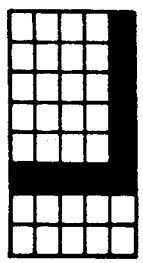
FIG. 3.45
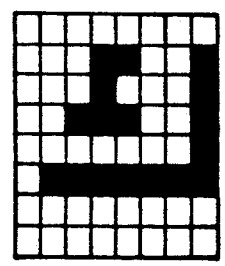
FIG. 3.46
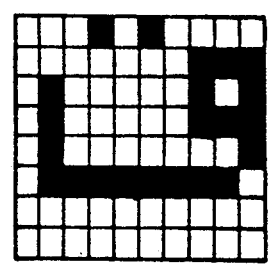
FIG. 3.47
FIG. 3.39 TO 3.47

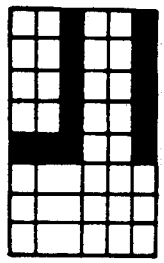 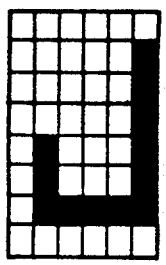 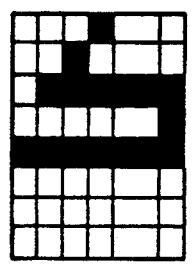 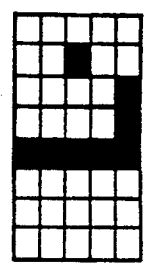
FIG. 3.48    FIG. 3.49    FIG. 3.50    FIG. 3.51
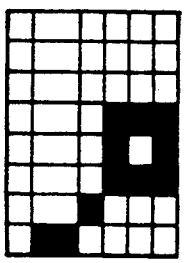 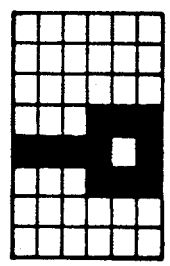 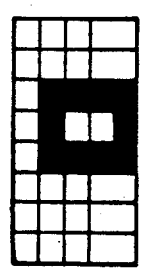 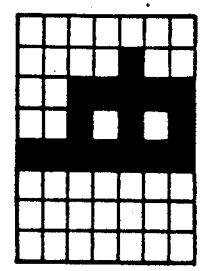
FIG. 3.52    FIG. 3.53    FIG. 3.54    FIG. 3.56
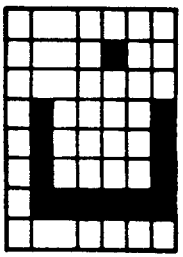 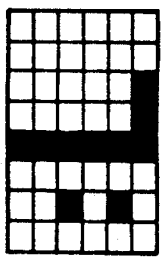 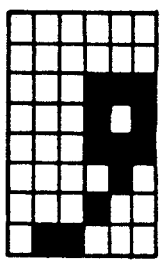 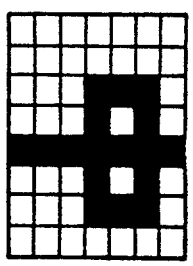
FIG. 3.57    FIG. 3.58    FIG. 3.59    FIG. 3.60
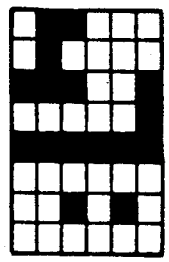 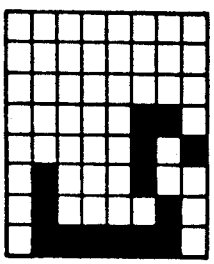 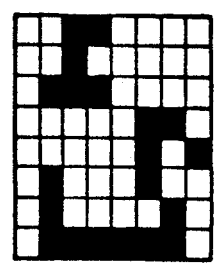
FIG. 3.61    FIG. 3.62    FIG. 3.63
FIG. 3.48 TO 3.63

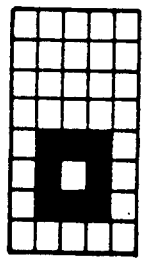
FIG. 4A
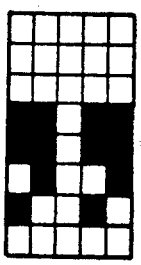
FIG. 4B
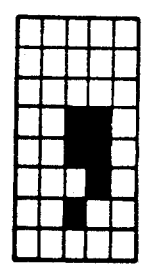
FIG. 4C
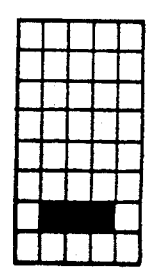
FIG. 4D
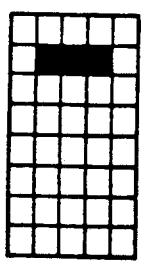
FIG. 4E
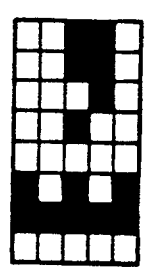
FIG. 4F
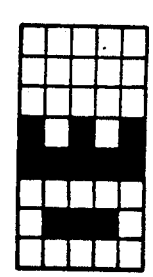
FIG. 4G
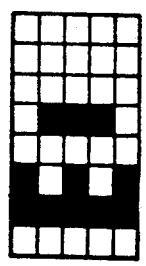
FIG. 4H
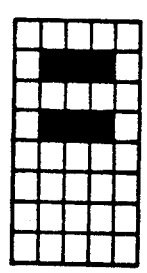
FIG. 4I
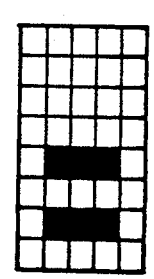
FIG. 4J
FIG. 4A TO 4J

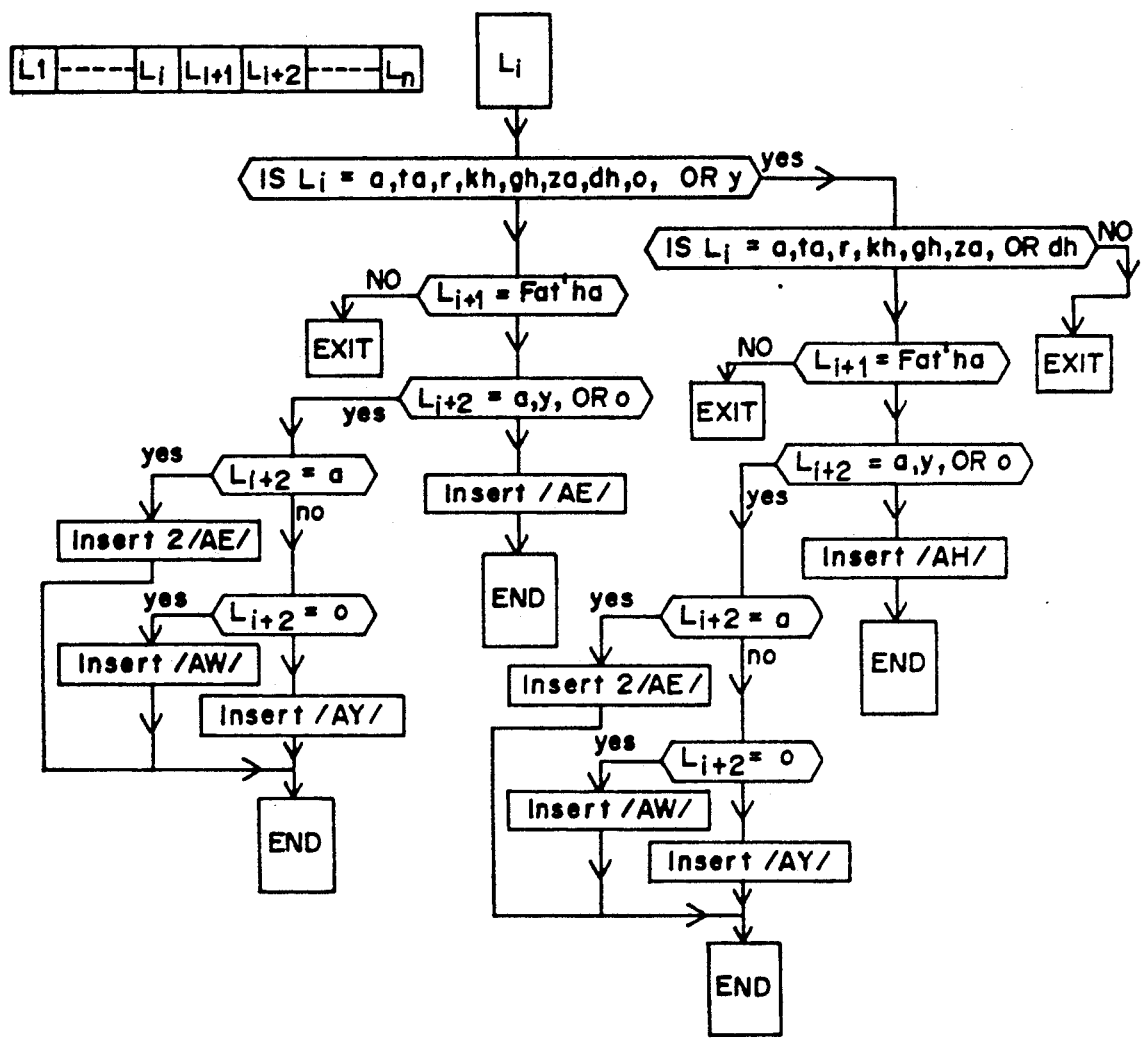
FIG. 7.a

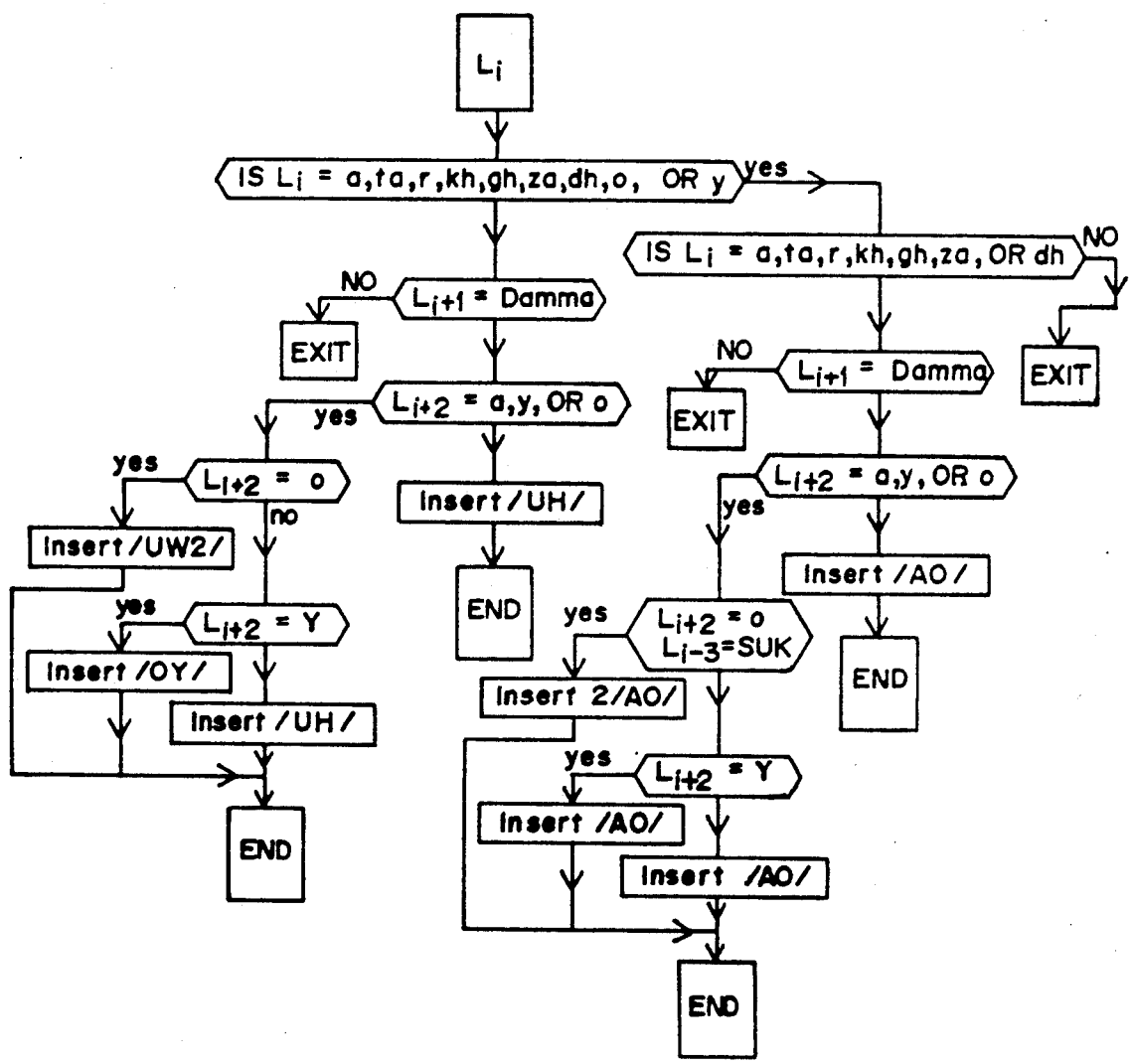
FIG. 7.b

FIG. 8

| MODE | PRONUNCIATION | | TRANSLATION | |
|---|---|---|---|---|
| | L1 | L2 | L1 to L2 | L2 to L1 |
| 1 | NO | NO | YES | NO |
| 2 | YES | NO | YES | NO |
| 3 | NO | YES | YES | NO |
| 4 | YES | YES | YES | NO |
| 5 | NO | NO | NO | YES |
| 6 | YES | NO | NO | YES |
| 7 | NO | YES | NO | YES |
| 8 | YES | YES | NO | YES |
| 9 | NO | NO | YES | YES |
| 10 | YES | NO | YES | YES |
| 11 | NO | YES | YES | YES |
| 12 | YES | YES | YES | YES |

L1: Arabic, Urdu, or Persian

L2: Arabic, Urdu, Persian, English French, or others.

TABLE-1

Table 2
The Arabic Letters

| Letter Script | Letter Name | Letter Name | English Symbol | English words having similar sounds. |
|---|---|---|---|---|
| ا | الف | Alif | A | ... |
| ب | باء | Bā | B | bless |
| ت | تاء | Tā | T | true |
| ث | ثاء | Thā | Th | think |
| ج | جيم | Jīm | J | judge |
| ح | حاء | Hā | H | ... |
| خ | خاء | Khā | KH | ... |
| د | دال | Dāl | D | dear |
| ذ | ذال | Dhāl | Dh | this |
| ر | راء | Rā | R | road |
| ز | زاي | Zay | Z | is |
| س | سين | Sīn | S | safe |
| ش | شين | Shīn | Sh | show |
| ص | صاد | Sād | S. | ... |
| ض | ضاد | D. | D. | ... |
| ط | طاء | Tā | T | ... |
| ظ | ظاء | Zā | Z | ... |
| ع | عين | Ayn | | ... |
| غ | غين | Hayn | GH | ... |
| ف | فاء | Fā | F | free |
| ق | قاف | Qāf | Q | ... |
| ك | كاف | Kāf | K | care |
| ل | لام | Lāa | L | light |
| م | ميم | Mīm | M | moon |
| ن | نون | Nūn | N | nice |
| ه | هاء | Hā | H | health |
| و | واو | Wāw | W | wealth |
| ي | ياء | Yā | Y | youth |
| ء | همزه | Hamzah | | ... |

... These sounds have no equivalent sounds in English and have to be learned by imitating the native speaker of Arabic.

FIG. 9

TABLE - 3
SOME FORMS OF THE ARABIC LETTERS

| | 1 | 2 | 3 | 4 | | | 1 | 2 | 3 | 4 |
|---|---|---|---|---|---|---|---|---|---|---|
| a | ا | أ | إ | | ta | ط | | | |
| b | ب | بـ | | | za | ظ | | | |
| t | ت | تـ | ـتـ | ـت | an | غ | ـغـ | ـغـ | ـغ |
| th | ث | ثـ | ـثـ | ـث | gh | غ | ـغـ | ـغـ | ـغ |
| j | ج | جـ | ـجـ | ـج | f | ف | فـ | ـفـ | ـف |
| ha | ح | حـ | ـحـ | ـح | q | ق | قـ | ـقـ | ـق |
| kh | خ | خـ | ـخـ | ـخ | k | ك | كـ | ـكـ | ـك |
| d | د | ـد | | | l | ل | لـ | ـلـ | ـل |
| zh | ذ | ـذ | | | m | م | مـ | ـمـ | ـم |
| r | ر | ـر | | | n | ن | نـ | ـنـ | ـن |
| z | ز | ـز | | | h | ه | هـ | ـهـ | ـه |
| s | س | سـ | ـسـ | | o | و | ـو | | |
| sh | ش | شـ | ـشـ | | y | ي | يـ | ـيـ | ـي |
| sa | ص | صـ | ـصـ | | aa | ع | ـعـ | ـعـ | ـع |
| dh | ض | ضـ | ـضـ | | la | لا | ـلا | | |

TABLE — 4

Signs of the Arabic modifiers

| O/U LETTER | MODIFIERS | |
|---|---|---|
| OVER | ╱ | 1 |
| UNDER | ╱ | 2 |
| OVER | ء | 3 |
| OVER | ◡ | 4 |
| OVER | ເ3 | 5 |
| OVER | ω | 6 |
| OVER | ﻭω | 7 |
| OVER | ⁼ | 8 |
| UNDER | ⁼ | 9 |
| OVER | ﻭﻭ | 10 |

FIG 12a

| ALLOPHONE | PHONEME | DURATION | ENGLISH USAGE | ARABIC USAGE |
|---|---|---|---|---|
| SILENCE | | | | |
| /PA1/ | | 10 ms | before /BB/DD/GG/AND/CH/ | Gemination,before STOPS & AFFRIC |
| /PA2/ | | 10 ms | before /BB/DD/GG/and /CH/ | as /pal/ between syllables |
| /PA3/ | | 50 ms | before /PP/TT/KK/,AND /CH/ and between words | between words, after/before conjunctions |
| /PA4/ | | 100 ms | between clauses and sentences | as in English, before conjunction |
| /PA5/ | | 200 ms | between clauses and sentences | as in English |
| SHORT VOWELS | | | | |
| /IH/ | / i / * | 50 ms | sIt, strandEd | KASRA .......... ب-ت-ت |
| /EH/ | * | 50 ms | End, ExtEnd | .......... |
| /AE/ | / a / * | 80 ms | hAt, extrAct | FAT'HA after group C ت-ت-ت |
| /UH/ | / u / * | 70 ms | bOOk, fUll, lOOk, kOOk | DAMMA ت-ت-ب-ب-ب-ت |
| /AO/ | * | 70 ms | sOns, tAlk | .......... |
| /AX/ | * | 50 ms | sUcceed, Instruct | .......... |
| /AA/ | / a / * | 60 ms | hOt, cOtton | FAT'HA after group A ب-ت-ت |
| /AH/ | / a / * | 80 ms | .......... | PAT'HA after group A ب-ت-ت |
| /AE1/ | / a / * | 50 ms | .......... | between group A and /AE/ ت |
| LONG VOWELS | | | | |
| /IY/ | / ī / | 170 ms | sEE, pEOple | long KASRA نين |
| /EY/ | | 200 ms | grEAt, trAY | .......... |
| /AY/ | / ai / | 170 ms | skY, trY | .......... |
| /AY1/ | / ai / | 250 ms | .......... | .......... |
| /OY/ | | 290 ms | bOY, tOY | as in English |
| /UW1/ | / u / | 60 ms | after cluster with YY,compUter | long DAMMA ر-ت-ن |
| /UW2/ | / ū / | 170 ms | twO, fOOd | .......... |
| /OW/ | | 170 ms | zOne, snOW | .......... |
| /AW/ | / au / | 250 ms | sOUnd, mOUse | .......... |
| /AW1/ | / au / | 250 ms | .......... | .......... |
| /AA1/ | / ā / | 250 ms | .......... | long FAT'HA after group A كتاب |

Table. 5a
English – Arabic Allophone

FIG. 12b

| ALLOPHONE | PHONEME | DURATION | ENGLISH USAGE | ARABIC USAGE |
|---|---|---|---|---|
| R-COLORED VOWELS | | | | |
| /ER1/ | | 110 ms | lettER, intERrupt | ************************ |
| /ER2/ | | 210 ms | bURn, bIRd | ************************ |
| /OR/ | | 240 ms | fORtune, stORe | ************************ |
| /AR/ | | 200 ms | alARm, fARm | ✓ as in غَار - ضَبَار |
| /YR/ | | 250 ms | clEAR, hEAR | ✓ as in عِيْر - بِيْر |
| /XR/ | | 250 ms | hAIR, repAIR | ************************ |
| /UR/ | | 120 ms | ************************ | ✓ as in نُوْر - زُوْر |
| /AR1/ | | 120 ms | ************************ | ✓ as in غَاز - دَار |
| /IR1/ | | 130 ms | ************************ | ✓ IN CVC as يَرْكَة - بَرْكَة |
| /IR2/ | | 130 ms | ************************ | ✓ IN CVC as طِن |
| VOICED FRICATIVES | | | | |
| /VV/ | | 130 ms | Vest, eVe | ************************ |
| /DH1/ | /ð/ | 140 ms | word initial THis, They | ذ as in ذٰلِك |
| /DH2/ | /ð/ | 180 ms | word final, between vowels | ذ as in أَنْذِب |
| /ZZ/ | /z/ | 150 ms | Zoo, phaSE | ز as in زَرْع - زَ - زِ - زُ |
| /ZH/ | /ʒ/ | 130 ms | beiGE, pleaSure | ج |
| /ZH2/ | /ð/ | 140 ms | ************************ | ذ SAKIN and vowel final |
| /ZH3/ | /ð/ | 100 ms | ************************ | ذ word initial and gemination |
| /ZH4/ | /ð̞/ | 150 ms | ************************ | ظ SAKIN and word final ظٰ |
| /ZH5/ | /ð̞/ | 100 ms | ************************ | ظ middle and word initial طبّى |
| /GH/ | /ɣ/ | 130 ms | ************************ | غ all غُ-غِ-غَ |
| /AN1/ | /ʕ/ | 70 ms | ************************ | ع SAKIN and in gemination |
| /AN2/ | /ʕ/ | 120 ms | ************************ | ع as in عُ-عِ-عَ |
| VOICELESS FRICATIVES | | | | |
| /FF/ | /f/ | 110 ms | Past, Foot | فُ - فِ - فَ |
| /TH/ | /θ/ | 130 ms | tooTH | ثُ - ثِ - ثَ |
| /SS/ | /s/ | 60 ms | teSt | سُ - سِ - سَ |
| /SH/ | /ʃ/ | 200 ms | SHip | شُ - شِ - شَ |
| /HH1/ | /h/ | 90 ms | before front vowels, He | هِ - هَ |
| /HH2/ | /h/ | 130 ms | Hoe, before back vowels | هُ |
| /HH3/ | /ħ/ | 70 ms | ************************ | ح short as in gemination |
| /HH4/ | /ħ/ | 120 ms | ************************ | ح as in حُ - حِ - حَ |
| /SS1/ | /sˤ/ | 70 ms | ************************ | ص short as in gemination |
| /SS2/ | /sˤ/ | 120 ms | ************************ | ص as in صُ - صِ - صَ |
| /SS3/ | /sˤ/ | 180 ms | ************************ | ص as in فصن - خِصن |
| /KH/ | /x/ | 130 ms | ************************ | خ as in خُ - خِ - خَ |
| /WH/ | /wh/ | 150 ms | WHig, WHite | |

Table.5b

FIG. 12c

| ALLOPHONE | PHONEME | DURATION | ENGLISH USAGE | ARABIC USAGE |
|---|---|---|---|---|
| AFFRICATIVES | | | | |
| /CH/ | | 150 ms | CHurch, CHina | ************************ |
| /JH/ | /dʒ/ | 100 ms | JudGe, inJure | الجان - جاء |
| /JH1/ | /dʒ/ | 150 ms | ************************ | Geminated فنجار - فنجان |
| /JH2/ | /dʒ/ | 150 ms | ************************ | word final فج |
| VOICELESS STOPS | | | | |
| /PP/ | | 150 ms | Pay, triP | ************************ |
| /TT1/ | / t / | 80 ms | testS, itS, before SS | FINAL IN CVCC syllables |
| /TT2/ | / t / | 100 ms | streeT, Two | ت - تِ - تَ |
| /TT3/ | / ṭ / | 100 ms | ************************ | ط SAKIN and word final ط - ط |
| /TT4/ | / ṭ / | 100 ms | ************************ | ط |
| /TT5/ | / ṭ / | 150 ms | ************************ | طِ |
| /TT6/ | / ṭ / | 100 ms | ************************ | ط in gemination نظّ |
| /KK1/ | / k / | 120 ms | Cate, Clown | ك as in كان |
| /KK2/ | / k / | 140 ms | final as tasK, speaK | ك as in دَلّ - فَلّ |
| /KK3/ | / k / | 80 ms | Quick, Crane | ك as in كُ |
| /QQ1/ | / q / | 100 ms | ************************ | ق as in قَ |
| /QQ2/ | / q / | 120 ms | ************************ | ق word final, ساكنة مقلقلة |
| /QQ3/ | / q / | 150 ms | ************************ | قِ syllable |
| /QQ4/ | / q / | 150 ms | ************************ | قُ syllable |
| /EE1/ | / ε / | 80 ms | ************************ | همزة ساكنة - ضوء - سماء |
| /EE2/ | / ε / | 60 ms | ************************ | ضوءَ - ضوءً - ضوءٍ |
| VOICED STOPS | | | | |
| /BB1/ | / b / | 40 ms | piB | ب in gemination, before consonants |
| /BB2/ | / b / | 60 ms | initial position, Beast | ب as in بَ - بِ - بُ |
| /BB3/ | / b / | 80 ms | ************************ | ب word final ساكنة مقلقله تبّ |
| /DD1/ | / d / | 50 ms | enD, coulD | د final & geminated عدّها |
| /DD2/ | / d / | 80 ms | DoWn, Drain | د دَقّ - دَرَ |
| /DD3/ | / d / | 120 ms | ************************ | د مقلقله - قد - أحد |
| /DH1/ | / ḍ / | 80 ms | ************************ | ض word final |
| /DH2/ | / ḍ / | 60 ms | ************************ | ض in gemination and clusters |
| /DH3/ | / ḍ / | 70 ms | ************************ | ض ضَ - ضِ |
| /DH4/ | / ḍ / | 150 ms | ************************ | ض syllables ضي |
| /GG1/ | / g / | 80 ns | before high front vowels, Guest | ************************ |
| /GG2/ | / g / | 80 ms | before back vowels, Got | ************************ |
| /GG3/ | / g / | 120 ms | peG, anGer | ************************ |

Table. 5c

FIG. 12d

| ALLOPHONE | PHONEME | DURATION | ENGLISH USAGE | ARABIC USAGE |
|---|---|---|---|---|
| RESONANTS | | | | |
| /W/ | /w/ | 150 ms | We, Warrant | as in وَ - وِ - وَ |
| /R11/ | /r/ | 130 ms | Read, Ray | as in رِبا - رَوِّخ |
| /R12/ | /r/ | 80 ms | Initial clusters bRown, cRane | as أمّر |
| /R13/ | /r/ | 80 ms | ✦×✦✦✦✦✦✦✦✦✦✦✦✦✦✦✦✦✦✦✦ | pharyngealized as in رَب |
| /LL/ | /l/ | 80 ms | Like, heLLo | as in لَ - لِ - لُ |
| /L11/ | /l/ | 80 ms | ✦✦✦✦✦✦✦✦✦✦✦✦✦✦✦✦✦✦✦✦ | in اللّه |
| /E1/ | | 130 ms | littLE, angLE | |
| /A1/ | | 240 ms | ✦✦✦✦✦✦✦✦✦✦✦✦✦✦✦✦✦✦✦✦ | اَل the particularization syllable |
| /Y11/ | /y/ | 90 ms | compUter, cUte | ي middle and clusters أيتِما |
| /Y12/ | /y/ | 130 ms | Yes, YoYo, initial position | ي word initial يوجد - يرفع |
| /W1/ | / / | 250 ms | ✦✦✦✦✦✦✦✦✦✦✦✦✦✦✦✦✦✦✦✦ | لَوٌ |
| /WAL/ | | 350 ms | ✦✦✦✦✦✦✦✦✦✦✦✦✦✦✦✦✦✦✦✦ | وال syllable والقمر |
| NASAL | | | | |
| /MM/ | /M/ | 180 ms | Milk | غَنَّة مَ - مِ - مُ |
| /MM1/ | /M/ | 250 ms | ✦✦✦✦✦✦✦✦✦✦✦✦✦✦✦✦✦✦✦✦ | ثم مِن - في التَشديد |
| /MM2/ | /M/ | 150 ms | ✦✦✦✦✦✦✦✦✦✦✦✦✦✦✦✦✦✦✦✦ | عنبر |
| /NN1/ | /n/ | 170 ms | thiN, earN | نَ - نِ نور |
| /NN2/ | /n/ | 140 ms | before back vowels, No. | غَنَّة من يَعلى |
| /NG/ | /n/ | 200 ms | aNger, stroNger | |
| /NN3/ | /n/ | 250 ms | ✦✦✦✦✦✦✦✦✦✦✦✦✦✦✦✦✦✦✦✦ | تنوين ـ ضربًا ـ عَدُوًّا |

✦ These allophones can be doubled.

Table 5.d

ARABIC LANGUAGE TRANSLATING DEVICE WITH PRONUNCIATION CAPABILITY USING LANGUAGE PRONUNCIATION RULES

RELATED APPLICATIONS

This application is related to Ser. No. 07/762,060, now U.S. Pat. No. 4,710,877 and is a continuation of Ser. No. 06/713,243, filed Mar. 18, 1985, now abandoned.

BACKGROUND AND SUMMARY OF THE INVENTION

I. INTRODUCTION

English language is becoming a universal language for communication and science. In almost every country children and adults learn English language at schools, colleges and institutions. The ordinary pocket dictionaries are used by millions of students, tourists, and businessmen.

A pocket or a desk-top electronic dictionary will be a very handy means, and a powerful educational tool, especially if it is provided with ability to pronounce words. With the recent advent of the electronic components it is now possible to store larger amounts of information in very tiny chips. In fact, the chip density of solid state memories is doubled almost every year. With simple calculation, it is not difficult to forecast that by 1986, it will be possible to store a half million characters on a single chip solid state memory.

This invention describes an electronic talking dictionary which can be used in general to translate language 1 to language 2, and/or language 2 to language 1; or language 1 to language 1. In this preferred embodiment, we describe the details of an English-Arabic, Arabic-English version. The invention has a considerable market in the Middle East as well as all over the world as hundreds of millions of muslims learn the basics of the arabic language as part of their religion. The device also has potential market in U.S.A. and Europe as hundreds of thousands travel every year to the Middle East for tourism or business missions.

Recently, new types of electronic dictionaries have been proposed which perform essentially word or sentence translation, e.g., Yanaguichi et al. U.S. Pat. No. 4,438,505; Morimoto et al. U.S. Pat. No. 4,417,319; and Levy U.S. Pat. No. 4,218,760. The invention presented here discloses unique and essential features not available in any of the above mentioned patents. The invention discloses word and sentence pronunciation capability based on *Linear Prediction Coding* of speech in which the allophone strings of words are stored in memory in memory files or generated by programmed pronunciation rules. This feature enables the user to initiate word search based on hearing a word without having to know its spelling. The invention discloses an input means which eliminates the need for a full Alphabetic Keyboard which confuses even the experts especially for multi-language keyboards as it is the case with the above-mentioned inventions. Levy's patent describes a multi-function 33 key keyboard, Morimoto's invention is based on a 60 key panel with multiple labels and functions. Yanaguichi's patent utilizes 26 keys. Our invention requires basically 4 keys for word/sentence selection, a key to initiate translation, and a 6th key to initiate pronunciation. This feature is a breakthrough in simplifying the method of operation and makes it feasible for pocketsize or even in watch products. The plug-in modules utilized by our invention are merely dummy solid state read only memories, thus, the device does not require expensive intelligent modules as in the Levy patent. Our invention discloses a display means and a storage means to identify and categorize a given word as whether it is feminine, masculine, singular, double, plural, noun, pronoun, adjective, root, verb, tense of verb, etc. This feature is essential in some languages as French, Arabic, and Arabic-like languages as Urdu and Persian. Finally, the invention is designed to meet the particular requirements of the script and phonetics of the Arabic languages (Arabic, Urdu, and Persian). Arabic language is spoken by 18 countries in the Middle East, Urdu is spoken by about 350 million in Pakistan and Northern India, Persian is spoken by about 60 millions in Iran and Central Asia. The Arabic languages are similar to the French language in the sense that "modifiers" or "accents" as shown in Table 4 over or under letters modify the pronunciation of words and their meaning. Hence, these modifiers should be shown for proper identification of words, and their translation. The Arabic text is always written from right to left in a connected form. Writing in discreet letters (as in English or Latin languages) is totally not acceptable. Accordingly, the Arabic letters may take different forms depending on their position in a word. Moreover, the Arabic letters are graphic type, and cannot be accommodated in a multi-segment display. Even fixed size dot matrixes sabotage the symmetry of the Arabic letter and produce poor quality font. The invention discloses a variable width character generator dot matrices means to generate the Arabic letters. This technique treats automatically the fixed size dot matrices as a special case. The synthesis of the sound of the words is based on sets of allophones and syllables stored using the Linear Prediction Coding method. The invention may utilize language pronunciation rules to generate the allophone/syllables string from the string of the letters-code of words.

In fact, the pronunciation of the Arabic language follows very well-defined rules. By following only a few of these rules, the sound of the most of the Arabic words can be generated from the string of the letter/modifier characters code. Our invention utilizes this fact to reduce the amount of memory required to store the sound code of Arabic words. The Arabic language is also a structured language. Almost every original Arabic word is derived from a 3 or 4 letter root. No root in the Arabic language may consist of less than 3 or more than 4 letters. The extracts are formed according to a well-defined set of formats. The invention helps the user to find the roots, as well as the popular extracts of some root words. The hardware and firmware are designed in such a way that the device adapts itself to different possible operating modes, depending on a plug-in memory module. A plug-in memory module contains look-up tables and data files, and parameters to condition the device. The device may thus operate in one of the modes in Table 1.

BRIEF DESCRIPTION OF THE DRAWINGS

The character of the invention, however, may be best understood by reference to one of its structural forms, and in relation to a specific language pair, as illustrated by the accompanying drawings and tables, in which:

FIG. 3.1 to 3.63 are the characters generator of Arabic letters according to the variable width dot-matrix method, FIG. 4.1 to 4.10 are dot matrices of the Arabic language modifiers, FIG. 7a and 7b are examples of flow charts to implement the pronunciation rules of the present invention, FIG. 8 (Table 1) shows the modes of operation of the preferred embodiment, FIG. 9 (Table 2) the Arabic letters and their nearest English letters, FIG. 10 (Table 3) shows the Arabic letters and their forms, FIG. 11 (Table 4) signs of the Arabic modifiers, and FIG. 12a (Table 5a), FIG. 12b (Table 5b), FIG. 12c (Table 5c) and FIG. 12d (Table 5d) shows the combined English-Arabic allophones set.

II. Arabic Letters and their Modifiers

Figure 1:
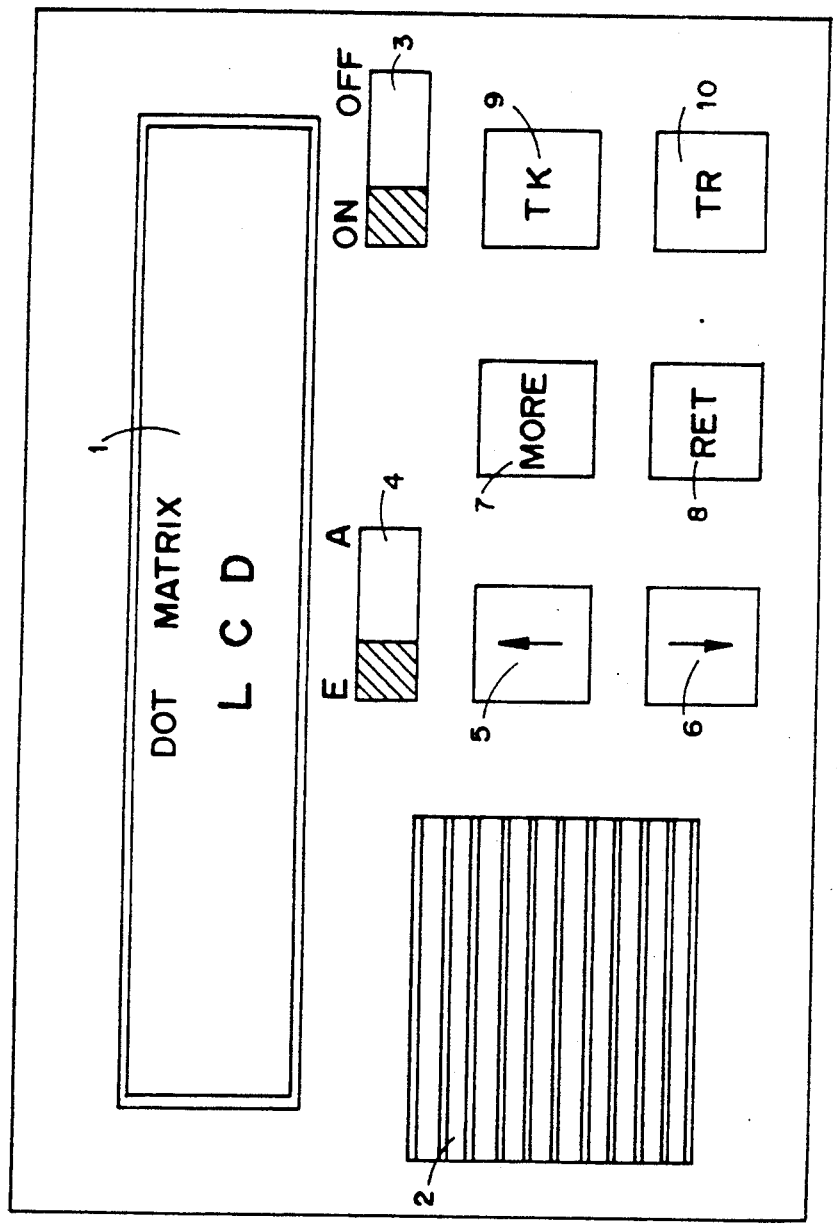
FIG. 1 is the front face of a preferred embodiment.

The Arabic letters together with their nearest English words having the same sounds are given in Table 2. Unlike the English language, the Arabic text is written from right to left, and the Arabic words are (not?) writable in discreet letters. Letters must be written connected word by word. Accordingly, the Arabic letters may take different forms depending on their position in a word. For example, the letter 'Ain, labelled (an) in Table 3, when it comes at the beginning of a word it takes the form (an-2), Table 3, in the middle of a word it is written as shown in (an-3), and at the end of a word it takes the form (an-4). Table 3 shows the Arabic letters and some of their forms, while FIGS. 3.1 to 3.63 show their dot patterns. The dot matrices of the Arabic language modifiers are given in FIGS. 4.1 to 4.10.

1. Short Vowel Modifiers

Short vowel modifiers or signs are three; Fat'hah, Table 4.1; Kasra, Table 4-2; and Dammah, Table 4-3. Fat'hah and Dammah are placed over the letters, while Kasra is placed under the letters Fat'hah, Damma, and Kasra are similar to the vowel sounds /a/,/u/, and /i/, respectively. Short vowels should be pronounced in a sharp and recognized manner. A sign of sukun Table 4-4 over a letter indicates that the letter should be pronounced unvoweled.

2. Long Vowels

The long vowel letters are WAW, O in Table 3; Y'a, Y in Table 3; and Alif, a in Table 3. The long vowel /ū/ is pronounced provided the letter WAW is modified by Sukkun, the preceding letter bears Damma. Similarly, the long vowel lil is pronounced if the letter Y'a, y in Table 3, is unvoweled and the preceding letter is modified by Kasra, Table 4-2. The long vowel /ā/ is formed if an Alif, a in Table 3, is preceeded by a letter voweled by a Fat'hah, Table 4-1. The point of articulation of the long vowels is the hollow portion of the mouth. During their pronunciation exhaling occurs and, therefore, their pronunciation depends on the air being exhaled. While exhaling continues, the sound of these vowels continue. The length of a long vowel is normally equal to two short vowels.

3. Repeated Letter Modifiers

A repeated letter modifier over a letter indicates that this letter is doubled. The first letter is unvoweled, while the second is voweled. Accordingly, there are three signs of repeated letters depending on the vowel of the second letter. The modifier shown in Table 4-5 over a letter indicates that the letter is doubled, the first letter is unvoweled, and the second letter is modified by the Fat'hah, the /a/ vowel. Similarly, the modifiers shown in Table 4-6 and 4-7 imply that the letter is double, the first letter is unvoweled, while the second letter is modified by the vowels /i/, or /u/, respectively.

4. Tanween Modifiers (Signs of /n/)

Tanween is an extra "an", "en", or "on" suffix sound that appears at the end of a word of its last letter is modified by one of the three modifiers shown in Table 4-8, 4-9 and 4-10, respectively. The pronunciation of Tanween may be influenced by the first letter of the next word. The rules of the pronunciation of Tanween are beyond the scope of this brief background. However, they may be found in many text books on Arabic language pronunciation.

III. Fundamentals of the Arabic Language Pronunciation Rules

English language has been a subject of intensive study in a variety of linguistic fields as phonemics, phonetics, and semantics. The recent advent in the electronic signal analysis techniques and in computer has led to a leap-frog in the understanding of the acoustic nature of the English sound and the mechanism of its production. As a result of that progress a variety of electronic products were developed, such as speech synthesis chips, language synthesizers based on the English allophone set, text-to-speech devices, and continuous speech recognition machines. Similar achievements are now also in progress in other languages as Japanese, French and German languages. This invention discloses an Arabic allophone set which was developed by the inventor as a result of almost two years of research work on Linear Prediction Coding of the Arabic language, and the Arabic text-to-speech rules. The invention discloses also a set of Arabic language pronunciation rules based on the said Arabic allophones. Programs for the English language pronunciation rules based on the English allophone set are now publically available in a variety of literatures as well as commercial products.

III. 1. The Arabic Allophones

The sounds of a language are called phonemes, and each language has a set which is slightly different from that of other languages. Consonants are produced by creating a construction or occlusion in the vocal tract which produces an aperiodic source. If the vocal cords are vibrating in the same time, as it is the case of the voiced fricatives /zz/ and /vv/, there are two sources; one which is aperiodic and one which is periodic Vowels are produced with relatively open vocal tract and a periodic sound source provided by the vibrating vocal cords. Vowels are classified according to whether the front or back of the tongue is high or low, whether they are short or long, and whether the lips are rounded or unrounded. Phoneme is the name given to a group of similar sounds in a language, and are acoustically different depending upon the word position. Each of these positional variants is an "allophone" of the same phoneme. The inventory of the English sounds contains 64 allophones. Some of the sounds in the English language are also a common to the Arabic language. However, there are also few phonemes in the Arabic language that don't exist in the English set. Table 5a-5b discloses the combined set of the Arabic and English allophones as developed by the inventor. Speech words can then be synthesized by concatenating individual speech sounds. Each allophone requires at most one identification code byte. On the average 4 to 7 allophones would be required to store the sound of a word. Moreover, by programming the following few pronunciation rules, the sound of most of the Arabic words can be generated from the string of the letter/modifier characters code, without having to store the allophones code. It should be understood that the following set of rules is given only here for the purpose of illustration. In fact, some of the rules have been simplified for economic reasons.

However, a complete coverage of this subject matter is outside the scope of this invention.

III. 2. Some Pronunciation Rules based on the Arabic Allophones

1. If a letter (except the Arabic letters labelled a, ta, r, kh, gh, dh, za, y, o, and a in Table 3) is modified by Fat'hah, Table 4-1, and the next letter is not one of the letters a, y, o, in Table 3; the allophone vowel /AE/ should follow the allophone of the letter.

2. If one of the letters a, ta, r, gh, za, dh, kh in Table 3 is modified by Fat'hah, and the next letter is not a,y,o, shown in Table 3, the allophone /AH/ follows the letter.

3. If any letter (except y in Table 3) is modified by a Kasra, Table 4-2, and the next letter is not a, y or o in Table 3; the allophone /IH/ comes after the letter.

4. If a letter (except a, ta, r, kh, y, o, dh, za, gh, of Table 3) is modified by Dammah, Table 4-3, and the next letter is not a, y, or o of Table 3, then the vowel /UH/ comes after the letter.

5. If one of the letters a, ta, r, kh, gh, dh, za is modified by a Dammah, Table 4-3; and the next letter is not a, y, or o of Table 3; the short vowels /AA/ or /AO/ may come after the letter.

6. If a letter (except a, ta, r, kh, gh, dh, za, y, o, or a of Table 3) is modified by a Fat'hah, Table 4-1, and the next letter is Alif, a in Table 3, the letter should be followed by two /AE/ vowels.

7. If one of the letters a, ta, r, kh, gh, dh, za is modified by a Fat'hah, Table 4-1, and the next letter is Alif, a in Table 3; the letter may be followed by the long vowel /AH2/ or two /AH/.

8. If a letter is modified by a Kasra, Table 4-2, and the next letter is unvoweled y in Table 3; the letter may then be followed by two short vowels /IH/ or the long vowel /IY/.

9. If a letter (except a, ta, r, kh, gh, dh, za, y in Table 3) is modified by a Dammah, Table 4-3, and the next letter is the unvoweled WAW, O in Table 3; the letter may then be followed by two short vowels /UH/ or the long vowel /UW2/.

10. If one of the letters a, ta, r, kh, gh, dh, za is modified by a Dammah, Table 4-3, and the next letter is the unvoweled WAW, O in Table 3; the letter may then be followed by two short vowels /AA/, or two /AO/, or the long vowel /OW/.

11. If a letter is modified by a double letter sign (tashdeed), the first letter shall be unvoweled, while the second letter shall be voweled according to the type of the double-letter sign, and according to the rules mentioned before.

12. The Allophone /LL1/ is used only in the glorious name of God "Allah". The Fat'hah vowel after /LL1/ should be the short vowel /AH/. If the glorious name of God is preceeded by the vowels /IH/ or /IY/, then the regular /LL/ should be used in the word "AL-LAH".

13. If for particularization an Alif, a in Table 3; and Lam, l in Table 3 are prefixed to any of the letters z, za, s, d, l, zh, t, r, sa, th, ta, sh, the sound /LL/ is not pronounced. While the next letter is doubled, e.g., sun is written Al-shamsu, but is pronounced Ash-shamsu. These letters are called shamsi letters.

14. If the speaker makes a stop at any word he may pronounce the last letter of that word unvoweled. This rule will apply regardless of the modifier on the last letter except when the modifier is the double letter sign in Table 4-8. If a speaker stops at a word ending with this modifier, he must stop with a normal short Fat'hah vowel according to the rules stated before. To stop at the letter t,4 in Table 3, the sound changes from /TT2/ to /HH1/ or /HH2/ regardless of the modifier of /TT2/.

15. If any of the guttural letters kh, ha, gh, an, h, aa in Table 3 comes after an unvoweled "Noon", n in Table 3, the Allophone /NN1/ should be used for the "n" sound.

16. /NN1/ is also used when the letter n in Table 3 is voweled by Fat'hah or Kasra.

17. If the letter n in Table 3 is voweled by Dammah, Table 4-3, the Allophone /NN2/ is normally used.

18. If a word ends by an unvoweled "Noon", n in Table 3, or the end of the word is modified by a tanween suffix and the first letter of the second word is also the letter n in Table 3; then the first N sound is assimilated with the sound. The combination sound is the long nasal resonant sound /NN3/ which is generated by forcing the air through the nose while the back of the tongue is touching the top of the mouth cavity.

19. If the last letter of a word is an unvoweled n in Table 3 or the last letter of a word is modified by a tanween suffix and the first letter of the second word is the letter m in Table 3, then the first N sound is assimilated with the second M sound and the combined sound is the long strong nasal sound /MM2/.

20. If the last letter of a word is modified by a tanween sign or it is an unvoweled n in Table 3 and the first letter of the second word is r in Table 3, the N sound is not pronounced and the new sound will be R-colored and doubled. The r-colored Allophone depends on the vowel preceding the N sound.

21. If the last letter of a word is modified by a tanween suffix sign or it is the unvoweled n in Table 3, and the first letter of the second word is l in Table 3; then the N sound is not pronounced and the L sound is doubled according to the regular rules of doubling.

22. If the letter b in Table 3 comes after an unvoweled n in Table 3 or a tanween sound, the N sound is usually converted to the allophone /MM1/.

23. If any other letter than n, o, l, m, y, r in Table 3 follows an unvoweled n in Table 3 or a tanween suffix, it is suppressed and moved toward the next letter, i.e., the allophone /NG/ should normally be used.

24. If any letter (except m and b in Table 3) comes as the first letter of a word immediately following an unvoweled m in Table 3, the allophone /MM2/ should be used for the M sound.

25. If an unvoweled m in Table 3 is followed by the letter b in Table 3 in another word, the pronunciation of the M sound is suppressed, and the allophone /MM1/ should be used.

26. If the unvoweled m in Table 3 is followed by a word starting with a voweled m in Table 3, the first M sound is assimilated with the second M sound. The allophone /MM1/ should then be used for the combination.

III. GENERAL DESCRIPTION OF THE PREFERRED EMBODIMENT

As shown in FIG. 1, the display media is a dot-matrix liquid crystal display LCD, 2 is a speaker output for voice production, 3 is an on/off SPST slide switch. The SPDT slide switch 4 (SW4) selects English-to-Arabic or Arabic to English translation. The dictionary look-up procedure involves four levels of data structure. In the first level I, the operator moves along the initial letter of words. In the second level, the first two characters of the word are allocated. The third level is the word allocation. Finally, the forth level contains explanatory notes of words (if any). Now to fix the idea, suppose that switch 3 is turned on and switch 4 is in the E position, i.e., in the English-Arabic mode. A log-on message will then be displayed. Now, if any of the keys 5, 6, 7, or 8 is momentarily depressed, letter A will then be displayed on LCD. If Key 5 [ ↑ ] is pressed and released quickly, letter A moves out and letter B comes in. Pressing 5 again mementarily letter C replaces letter B on the display 1, and so on. However, if Key 5 [ ↑ ] is continuously pressed the letters change automatically at a faster rate until Key 5 [ ↑ ] is released. The Key 6 [ ↓ ] performs exactly the opposite function, i.e., pressing 6 for a short time causes the letter on the LCD 1 to move down and its preceding letter to replace it on the display. Continuously pressing 6 causes the letters to jump backward quickly until Key 6 is released. Suppose that the user wants to look up for the word "WROTE". The user then manipulates keys 5 and 6 until the letter "W" is on the LCD display 1. The user now presses Key 7, the [MORE] Key, for the device to jump to the next level of search. Now, "WA" appers on the display 1. Again, the user manipulates the key [ ↑ ] and [ ↓ ] until "WR" is displayed. Then, if the user presses Key [MORE] the dictionary goes to the level III of search, that is the word search level. In word search, complete words are displayed, for example, the word "WRACK", say, appears on the display 1 together with appropriate explanatory abbreviations on the far right of the display. Again, here keys 5 and 6 are used to allocate the required word, i.e., "WROTE" on the LCD display 1. When the word "WROTE" is brought on the display, abbreviation like V.P.T. may be displayed to indicate that "WROTE" is a past tense verb. Moreover, the abbreviations may flash to indicate that further explanatory note is available. If the Key 7 [MORE] is then pressed an explanatory message will be displayed. In this example, an explanatory not as "WRITE" together with an abbreviation as V.P.R. appears on the display 1.

The Key 8 [RETURN] is used always to exit from the current search level and go back to the previous level. Thus, to return to the word "WROTE" the user should press [RETURN]. Finally, to hear the pronunciation of "WROTE" the user presses Key 9 [TALK]. The user may repeat pressing the [TALK] Key as many times as he wishes to hear the displayed word. To obtain the Arabic translation, the user presses Key 10 [TR], the Arabic.meaning appears written from right to left. If the Arabic text is followed by the character comma ",", another meaning or an Arabic explanation may be available. The user presses [MORE] to obtain the other meaning.

To go back to the English display , the user presses the [RETURN] Key. If the user may then decide to look for another word close to "WROTE", he may manipulate keys 5 and 6 to allocate the new word . . . and so on. However, if he want to look up for other different words. He may then press [RETURN] to go back to level II of search, that is the two initial letters level, or press [RETURN] again to go back to the letter level I.

IV. DATA STRUCTURE

The English and the Arabic words are stored in two main files; English Word File (EWF) and Arabic Word File (AWF). Each file consists of variable length Data Segments (DS). There is one DS for each word. The format of the DS is the same for the Arabic and the English files. The general format of DS of an English word is shown in FIG. 4. The DS is headed by an identification field 50 of two control bytes CB 51. The control byte CB may be chosen to be (FF) HEX. Care should be taken so that such combination should not appear elsewhere in the DS. Following the Header is a string of characters code of the English word 53. In this embodiment, the character code is taken to be the standard ASCII Code. The first byte of the field 53 is an Identification byte ID1 52 as shown in FIG. 4. The identification code in this bye is as follows:

| Bit 1 | Comments/NO comments available |
|---|---|
| Bit 2 | Original word/a usage of |
| Bit 3 | Pronunciation by rules/by stored allophones code |
| Bit 4 to 8 | Code for an explanatory abbreviations is shown below. |

A sample of the explanator abbreviations is shown below:

| a. | adjective |
|---|---|
| adv. | adverb |
| a.f | feminine adjective |
| a.p. | plural adjective |
| a.p.f. | plural feminine adjective |
| n. | noun |
| n.p. | plural noun |
| n.f. | feminine noun |
| n.f.p. | plural feminine noun |
| v. | verb |
| v.p.t. | verb in the past tense |
| v.p.r. | verb in the present tense |
| cn. | conjunction |
| p.p. | preposition |
| p.p.r. | present participle |
| p.p. | past participle |
| . | . |
| . . | . |

Bit 2 is useful in such cases when we have a word like "ORDER" and one or more usages of the word, as "IN ORDER", "IN ORDER TO", "IN SHORT ORDER", "ON ORDER", "ON THE ORDER OF", "OUT OF ORDER", etc.

The English word is stored, as mentioned before, in the ASCII coded string following the ID1 byte 52. When the system is to read and display the ASCII encoded string, if it encounters a special ASCII control code, it places the original word between two "SPACE" characters in place of the ASCII control code. The device also looks for the control byte 54 which indentifies the end of the English word field. If bit 1 of ID1 52 is set, indicating an explanatory message is available, the device expects the address of this message in the two bytes 55 next to the control byte 54.

If Bit 1 of ID1 52 byte is not set, the device will then consider the field following the English word field 53 as the allophone string field 57 of the English word or expression. The control byte CB 58 is used to mark the end of the allophone string field, and the beginning of the Arabic translation field 62. However, if bit 3 of ID1 52 is set to indicate that the pronunciation of the word is performed by rules, the allophone string field 57 and the control byte 58 will not be stored. In this case, the Arabic translation field 62 comes immediately after 55.

The Arabic translation field contains 62 contains the address of the Arabic words which carry the nearest meaning of the English word or sentence. Each address is 3 bytes. However, the first byte of each address is divided into two zones. The least significant 3 bits are cascaded with the next two bytes to form a 19 bit address 60 of the Arabic word. The most significant 5 bits of the first byte is an identification code ID2 59. The code 59 tells the device whether the word is followed by a "space" character or not, as is the case when the word is followed by a suffix or the word itself is a prefix, or whether it is followed by another word, and whether another sentence or meaning follows or not. The code also may clarify whether modifiers (accents) are necessary for the correct meaning or it should be discarded from the Arabic word, etc. As mentioned before, the Data Segments of the English words are stored in the English Word File (EWF), while the Data Segments of the Arabic words are stored in the Arabic Word File (AWF). These two files normally occupy the major part of the storage area. Language character generation may be performed into two steps. In the first step the character code is used to access the address of the character pattern. This stage requires a code-address conversion table. Then, the address is used to fetch the pattern of the character from the character generation file. This is in particular the case for the Arabic language, as different dot matrix lengths may be needed to generate the letters pattern. Thus, an Arabic Character Code Address Table (ACCAT) and Arabic Character Generator File (ACGF) are used for this purpose. On the other hand, the English characters can be stored in fixed-size dot matrices, and hence the English Character Code/Address Table (ECCAT) may not be needed. However, if this is the case, the Module Identification Table configures the device to such case as it will be explained later.

Sound generation is performed through voice synthesis using the Linear Prediction Coding method. Each word is synthesized by concatenating its allophones or allophone/syllables combination. Each allophone or a syllable consists of several frames of LPC coefficients. The LPC coefficients of the English allophones are stored in the English Allophone file (EAF). Similar to the character generation mechanism, the address of these allophones are obtained with the aid of Allophone Code/Address Table (EACAT). Similarly, the Arabic words are synthesized with the aid of the Arabic Allophone Code/Address Table (AACAT) and the Arabic Allophone File (AAF).

Figure 6:
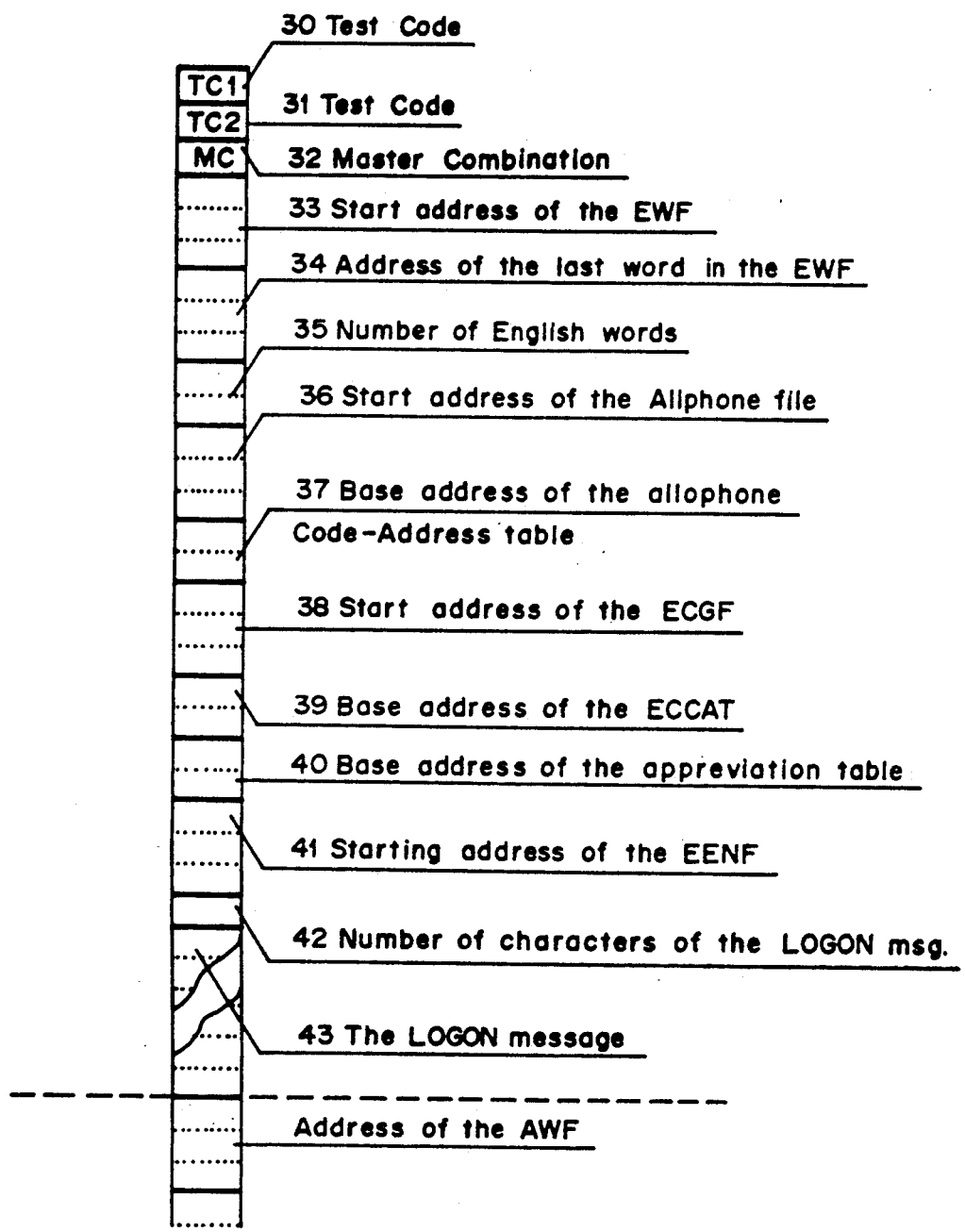
FIG. 6 is the format of the module identification table.

The character string of the abbreviation coded in ID1 52, FIG. 3 is obtained by the Abbreviation Tables (EAT) and (AAT) for the English and Arabic, respectively. The auxiliary explanatory notes (Level IV of search) may be stored in separate files; English Explanatory Notes File (EENF), and Arabic Explanatory Notes File (AENF). Finally, the Module Identification Table (MIT) contains the parameters to reconfigure the system for different operating modes. The MIT is stored in the first memory page (memory page is 256 bytes) of the Module Storage. The format of the MIT is shown in FIG. 6. TC1 30 and TC2 31 are Test Codes. The device first reads these two bytes and compares them with prestored bytes. If matching is unsuccessful the computer then flashes an appropriate ERROR symbol and produces a buzzer to indicate that the module is not in place or not functioning properly. However, if matching is successful, the computer then proceeds on to read and decode the rest of the MIT. Byte 3 contains the master combination of the mode. Bit 8 and bit 7 indicate whether Language 1 or Language 2 is to be written from right to left (as the case with the Arabic languages) or from left to right. The least significant bits of this byte indicate one of the modes in Table 1. Bytes 4, 5, and 6 contain the starting address of the English Word File (EWF) (or language 1). Bytes 7, 8, and 9 contain the address of the last word in the EWF. Bytes 10 and 11 contain the number of words in the EWF. Then comes, in bytes 12, 13 and 14, the address of the English Allophone File (EAF), followed by two bytes containing the base address of the EACAT, i.e., the address after truncating the first 8 least significant bits (as this table is always stored at the 256 boundaries). The starting address of the English Character Generator File (ECGF) is stored in bytes 17, 18 and 19. The base address of the ECCAT is stored in bytes 20 and 21. If byte twenty contains (FF) hex, the computer considers that the characters are stored in fixed size matices. The size of the matrices (as $8 \times 5$, $8 \times 6$, $8 \times 7$ or $8 \times 8$) is given in byte 21. The base address of the English Abbreviation Table (EAT) is stored in bytes 22 and 23. Bytes 24, 25 and 26 contain the address of the Explanatory Notes File (EENF). Finally comes an English log-on message, the first byte of which indicates the number of characters in this message. The Arabic (language 2) parameters follow the English log-on message in the same format as the English parameters. If any of these addresses is not applicable, its bytes should be filled by (FF) hex. For example, if EENF is not used, bytes 24, 25 and 26 (or at least 24) should be filled with (FF) hex.

V. HARDWARE DESCRIPTION

Figure 2:
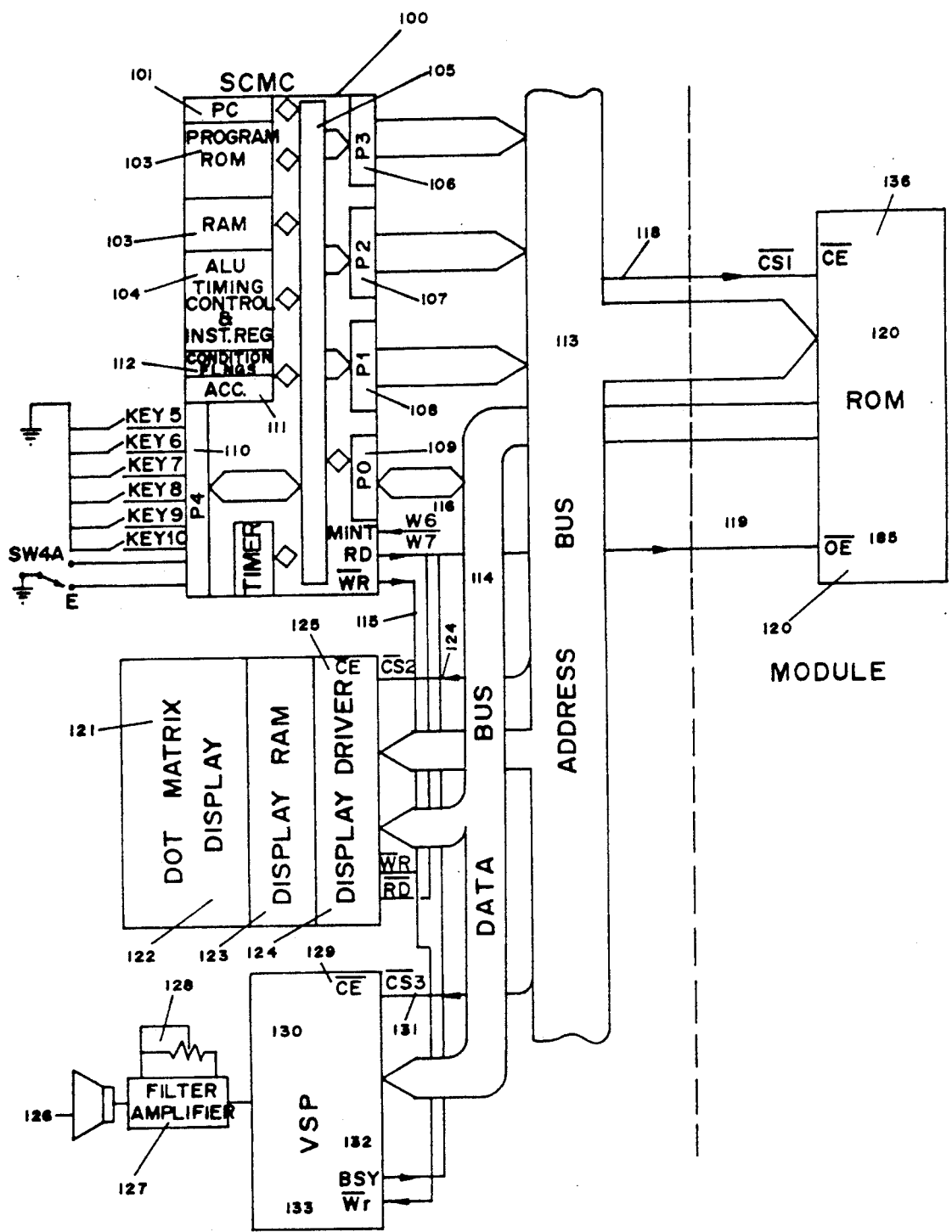
FIG. 2 is a block circuit diagram of a device according to the invention.
Figure 5:
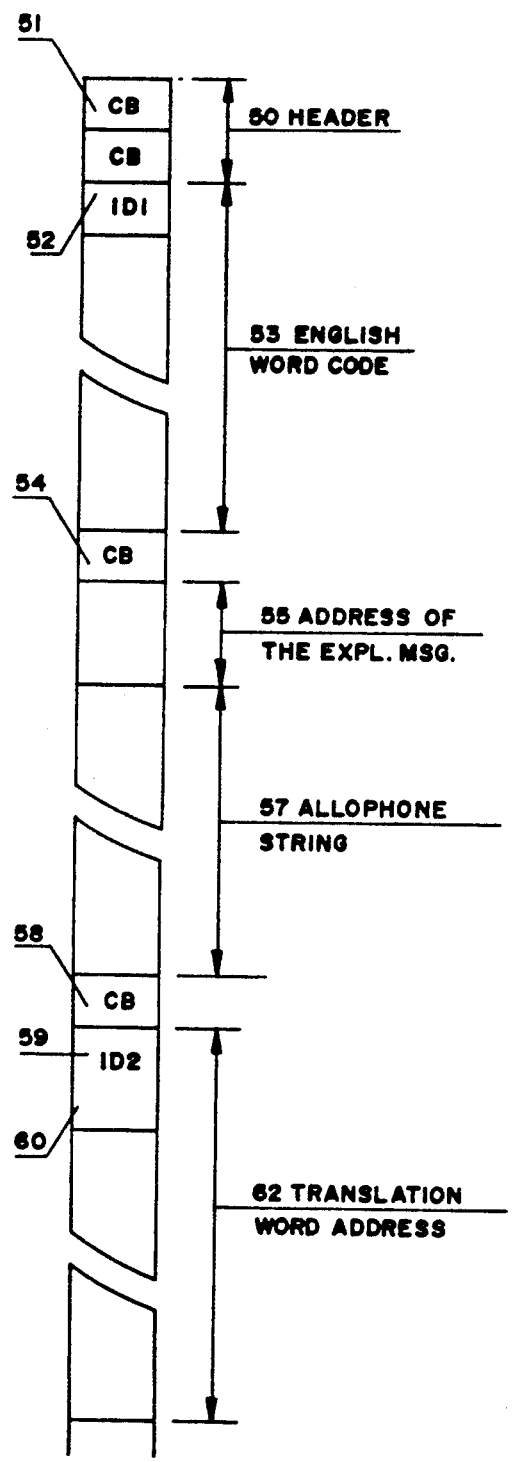
FIG. 5 is the format of the data structure of a data segment.

The detailed description and specific examples given herein below, while indicating preferred embodiments of the invention, are given by way of illustration only, since various changes and modifications within the spirit and scope of the invention will become aparent to those skilled in the art from this detailed description. As shown in FIG. 2, the invention consists of a Single Chip Micro Computer (SCMC) 100, which contains a Program Counter (PC) 101 which points to the address of the next instruction stored in the program Read Only Memory (ROM) 102. There is also a Random Access Memory (RAM) 103 used as temporary storage, a timing circuit, control logic and an Arithmetic Logic Unit (ALU) 104. There is also Accumulator 111, condition flags 112, and a timer-counter 139. Data move inside the SCMC through the Internal Bus 105. The SCMC communicates with the outside world through five ports P1, P2 and P3 are output ports connected to the System Bus 113. Port 4 140, is an input port with internal pull-up. P4 is connected to SW4 and keys 5 to 10 in FIG. 1. P0 is an input/output port connected to the system Data Bus 114. The direction of flow of data to and from the SCMC is governed by the two output control signals $\overline{RD}$ 117, and $\overline{WR}$ 115. If $\overline{RD}$ is low, Po acts as an input port, and if $\overline{WR}$ is low, it is an output port. The display section 121 consists of an LCD dot matrix display 121; multiplexers, drivers and interface logic 124, and a display RAM 123 which contains image of the data displayed on the dot matrix. The RAM section 123 is accessible to the SCMC through the Data Bus 114, the Address Bus 113, the Chip select two $\overline{CS2}$ 134, and the $\overline{RD}$ and $\overline{WR}$ lines. The $\overline{CS2}$ 134 line is connected to the Chip Enable $\overline{CE}$ 125 of the display section 121. If $\overline{CE}$ input 125 is high the display section 121 ignores all the signals on the Data Bus and the Address Bus, and its output driver circuits go into a tri-state (a high impedence state or float) so that the SCMC can communicate with the external memory module or the VSP 130 without affecting the display section 121.

The VSP 130 is a Voice Synthesis Processor which accepts the Linear Prediction Codes. LPC of the voice to be synthesized and produce an analogue audio signal which is then amplified and filtered to drive a Speaker 126. 128 is a potentiometer for volume level control. The VSP communicates with the SCMC through the Common Data Bus 114, the Chip Select three line $\overline{CS3}$ and the $\overline{WR}$ line, and the Maskable Interrupt line $\overline{MINT}$ 116. The $\overline{CS3}$ is connected to $\overline{CE}$ 129 input of the VSP chip. If $\overline{CS3}$ is high, the VSP ignores all the signals on the Data Bus 114, and the $\overline{WR}$ signal 115. The Busy BSY 132 output signal of the VSP is connected to the Maskable Interrupt Input $\overline{MINT}$ 116 of the SCMC 100. If the BSY signal is high, it indicates that the VSP is busy processing the last set of the LPC coefficients and cannot accept any more coefficients at the moment. The SCMC communicates with the VSP 130 when it is interrupted by the VSP. During normal operation the $\overline{MINT}$ input is disabled unless the Key 9 [TALK] is pressed and the SCMC 100 is ready to send continuously the LPC coefficients of the allophone of the word to be pronounced.

The $\overline{MINT}$ 116 is disabled as soon as the word utterance is completed. Finally, the external ROM module 120 is enabled via a seperate chip select line $\overline{CS1}$ which is connected to the $\overline{CE}$ 136 input of the external ROM 120. The output enables input $\overline{OE}$ 135 is connected to the $\overline{RD}$ signal of the SCMC. The data output lines of 120 are connected to the Common Data Bus 114. The address input lines are connected to the Common Address Bus 113. The ROM 120 data output lines are normally in the tri-state (floating) unless both $\overline{CE}$ 136 and $\overline{OE}$ 135 are driven by low signals.

VI. INTERNAL OPERATION

When Power is initially supplied by switching SW3 to the ON position, the control and timing circuit in 104 resets the program counter 101 and the main sub-blocks of SCMC 100, and starts execution of the main program residing in the Read Only Memory ROM 102. The control and timing circuit 104 provides also all the signals for program execution and data transactions among the various function blocks of the SCMC, as well as reading and writing from and to the outside devices 121, 129 and 120. The control and timing circuit contains also conditional branch logic and instruction decoding logic. The Arithmetic Logic Unit in 104 receives input from the Accumulator ACC 111 and temporary registers in the internal RAM 103. The condition Flags 112 are used for the Arithmetic and Logic operations and connected to the ALU logic and main bus. The RAM 103 is made up of a data storage section for program variables, a memory stack for program nesting, and registers for data manipulations. The SCMC writes to the external devices by sending the address to the common Address Bus through the output ports 106, 107 and 108. Then, the Data is transferred to the Data Bus through P0 109, followed by resetting the $\overline{WR}$ line 115 to the low level. In the external Read operation, the SCMC sends the address to the Common Address Bus 113 through ports 105, 106 and 107. In the meantime, P0 109 is conditioned to be an input port. The Read line $\overline{RD}$ 117 is then reset to the low level. The period of the low level of the $\overline{RD}$ and $\overline{WR}$ signals are chosen to be long enough to match the slowest external device.

When the power is turned on by SW3, the SCMC initializes first the display by writing zeros into the display RAM 123, then reads the first two bytes of the external module. The two bytes are then matched with prestored bytes. If matching is not successful, an error symbol is displayed flashing and a buzzer sounds to indicate that no module in place or the Module is not working. If matching is successful, the SCMC starts to read the Module Identification Table MIT and store the mode parameters in its RAM 103. The SCMC then reads Port 4 and tests the bits connected to switch SW4 to decide whether it is in the E position-English-to-Arabic (language 1 to language 2) or the A position Arabic to English (language 2 to language 1).

If the MIT indicates one of the first four modes in Table 1, the effect of SW4 is disabled. Now suppose, without loss of generality that SW4 was on the E position, the SCMC then reads the Log-on message from language 1 MIT, and displays the message on the LCD dot matrix display. When the SCMC reads a character code it shifts the code one bit to the left and forms an address in which the least significant eight bits are the shifted code, and the most significant bits are the base address of the character Code-Address Tables. The SCMC executes two read cycles from the external ROM 120. The fetched two bytes constitute the least significant address bits of character pattern in the Character Generator File. The most significant byte is obtained from the address field of the Character Generator File. The formed address is used again to bring the character pattern byte by byte and store them into appropriate locations in the display RAM. If the Character Code-Address Table is not used as it is the case with the English characters, the Character address is formed by simply multiplying the character ASCII Code by the character matrix width to form the least significant bits of the address of the character pattern in the Character Generator File. As soon as the Log-on message is displayed, Keys 5, 6, 7 and 8 are checked for depression. If any is activated, the SCMC then clears the display and prints the letter A. The SCMC checks again if any of the Keys 5, 6 or 7 is pressed and takes an appropriate action as explained before. When the English word has been allocated and the [TALK] Key is depressed, the SCMC then takes the allophone code and multiplys it by 2 (shifts left one bit) and forms a memory address in which the first byte is the shifted code, and the most significant bits are obtained from the base address of the English Allophone Code-Address Table (EACAT). The formed memory address points now to the starting address of the LPC coefficient of the Allophone. The VSP 130 accepts the LPC coefficients for one speech frame at a time. The SCMP performs as many writing cycles to the VSP as required to transfer the LPC Codes for one complete frame. The VSP then starts the synthesis operations, and sets its BUSY line BSY 132 high in order to tell the SCMC that no further data are accepted. The VSP resets the BSY line shortly before it completes the speech frame. The low signal on line 116 interrupts the SCMC to send the LPC coefficients of the next frame, and so on until the end of the word. The SCMC recognizes the end of an allophone by a special code at the beginning of an LPC frame. Information like stress and intonation may be added to the allophone string to humanize the voice output. If Bit 3 of ID1 52 of a word is set, the SCMC calls firmware subroutines to generate the allophone string of the word from the character string of the word by following language pronunciation rules. In Arabic languages, most of the words can be pronounced by following a few pronunciation rules. It is also possible to use text to speech rules to generate the allophone string of English words together with intonation and stress information from the character string directly. In the case of English language such program requires relatively large amounts of memory. However, for large amounts of vocabularly, direct programming of the English pronunciation rules may provide potential saving in the memory requirements. In another version of this invention, possibly for large number of vocabulary, multi-language, and desk-top operation, removable storage means could be a cassette, a floppy disk or a magnetic-bubble memory, which would then be loaded partially or totally into a system RAM area inside the invention. The pocket-sized type may also be made to function as an Electronic Calender/Alarm whenever the dictionary function is not used. In fact, the input means disclosed in this invention, which eliminates the need for full alphabetic Keyboard, makes it even possible to implement the dictionary function in a wristwatch. In another product, the dictionary function may be combined with calculator means to serve as multi-purpose student mate.

I claim:

1. An electronic dictionary and translating device for retrieving one or more words of a first language corresponding to a selected word group of a second language, wherein one of the said languages is an Arabic-related language such as, Arabic, Persian, and Urdu, the device comprising:

(a) a dot matrix display screen means comprising a plurality of electronics and logic for bit-mapping patterns stored in a display memory means, said display screen comprising additional display areas for Arabic diacritics over and under letters, (b) a first memory means containing patterns of characters of said first and second languages, wherein said patterns of the characters are stored in variable width dot matrices, and wherein the patterns of the characters of said Arabic languages include a set of Arabic language diacritics that appear over or under other Arabic characters, (c) a second memory means containing characters code/address tables, for the first and the second languages wherein the code of a character points to an entry in said table containing the memory address of the character dot matrix in said first memory means, (d) a third memory means divided into variable-length data segments, wherein the said data segments are separated by one or more control characters, and wherein each data segment contains an explanatory message in the FIRST language, (e) a fourth memory means divided into variable-length data segments, wherein the said data segments are separated by one or more control characters, and wherein each data segment contains an explanatory message in the SECOND language, (f) a fifth memory means comprising tables of speech parameters comprising linear predictive coding parameters of the allophones of said first and second languages, and comprising tables for allophone code/address lookup, wherein each allophone code points to an entry in a code/allophone table containing the address of the memory location containing the table of the speech parameters of the allophone, (g) a first firmware means containing language pronunciation rules for generating the allophonic components of the words of one or more languages, one of the said languages being the Arabic language, (h) a voice synthesizer means which produces speech voice in accordance with speech parameters comprising the linear predictive coding parameters, (i) a sixth memory means, comprising a first language word file, divided into variable-length data segments, wherein the said data segments are separated by one or more control characters, wherein each data segment is subdivided into fields, wherein one or more words of the FIRST LANGUAGE is stored in one of said fields, wherein codes of the allophones for pronunciation of said one or more words may be stored in a second of said fields, wherein a third of said field contains the memory addresses of a data segment of an explanatory message in said THIRD memory means, and wherein a fourth of said fields contains the memory addresses in a seventh memory means of data segments which contain words from the SECOND LANGUAGE which correspond in meaning to the said one or more words of the FIRST LANGUAGE, (j) a seventh memory means, comprising a second language word file, divided into variable-length data segments, wherein said data segments are separated by one or more control characters, wherein each data segment is subdivided into fields, wherein one or more words of the SECOND LANGUAGE is stored in one of said fields, wherein codes of the allophones for pronunciation of the said one or more words may be stored in a second of said fields, wherein a third of said field contains the memory address of a data segment of an explanatory message in the said FOURTH memory means, wherein a fourth of the said fields contains the memory addresses in said sixth memory means of one or more data segments which contain words from the FIRST LANGUAGE which correspond in meaning to said one or more words of the SECOND LANGUAGE, (k) a input means and word/sentence selection means comprising four basic search levels, four keys for word/sentence selection, a fifth key to initiate pronunciation, and a sixth key to initiate translation, wherein the first search level a single letter is displayed on the dot matrix screen, and the first key causes said letter to scroll up, the second key causes the displayed letter to scroll down, and the third key clears the display and restarts the search, and a fourth key causes the start of the second search level, and wherein in said second search level the first key causes a second displayed letter to scroll up, the second key causes a second displayed letter to scroll down, the third key causes said second displayed letter to disappear and the search level to go back to said first search level, and the fourth key causes the start of the third search level, wherein said third search level a complete word starting with the said first and second letters is displayed, and the first key causes displayed words to scroll up in the said first language word file, the second key causes displayed words to scroll down in the first language word file, the third key causes search level to go back to the second search level, the fourth key causes a fourth search level to start, wherein in said fourth search level an explanatory message (if available) is displayed, and wherein said fourth search level the third key causes the search level to go back to the third search level, wherein in said third search level the fifth key causes the displayed word or words to be enunciated, and the sixth key causes a translation in the second language to be displayed, and wherein when said second language is displayed the fourth key causes other meanings or an explanatory message in the second language (if available) to be displayed, and the third key causes the display in the second language to terminate and the search level to go back to the third search level, (l) a microprocessor means comprising an arithmetic logic means, plurality of accumulators and working registers, a random access memory, a timing and control unit, a program counter, stack registers, an internal ROM comprising a plurality of memory means and firmwares, wherein said microprocessor means comprises a plurality of input/output lines and control lines for interfacing and communication with the said dot matrix display means, said input means, said voice synthesis means, and with a second random access means comprising one or more of said first to sixth memory means, wherein said microprocessor means continuously scans said six keys of said input means and performs a word search as set forth in the k-th paragraph above and in accordance with execution steps stored in a second firmware means, wherein said microprocessor means scrolls down in said word files by allocating the control characters at the beginning of the next data segment then retrieving and displaying one or more words stored in the first field in said data segment, wherein said microprocessor means scrolls up in said word files by allocating the control characters at the beginning of the previous data segment then retrieving and displaying the one or more words stored in the first field in said data segment, wherein said microprocessor means displays a character by using said code/address tables stored in the first memory means (as set forth in paragraph c) to find the address of said character's dot matrix in said second memory means, and then copying said character's dot matrix to said display memory means (as set force in paragraph a), wherein said microprocessor means performs an enunciation procedure for a displayed word or words in response to said fifth key by retrieving the allophone codes stored in said second field of said data segment (as set forth in paragraph l) containing the displayed word or words, wherein if said second field is empty said microprocessor means generates such allophone codes in accordance with pronunciation rules stored in said first firmware means, wherein said microprocessor means then obtains the memory address of stored parameters of allophones by using the allophones code/address tables stored in said fifth memory means (as set forth in paragraph f), wherein said microprocessor means then retrieves the parameters of the allophone and sends them sequentially to said voice synthesis means, wherein said microprocessor means performs a translation of the displayed word or words in response said sixth key by retrieving the address of the first word in the second language stored in said fourth field of the data segment of said displayed one or more words, wherein said microprocessor means uses said address to allocate the data segment in said word filed of the second language, wherein said microprocessor means then retrieves and displays the said one or more words of the second language from the first field of said data segment in the word file of the second language, wherein said microprocessor means may then display the other words of the second language corresponding to said one or more words of the first language in response to said fifth key by retrieving sequentially the addresses stored in said fourth language, and then fetches and displays the corresponding words of the second language stored in said word file of the second language, and wherein said microprocessor means displays an explanatory message corresponding to a displayed word in response to said fourth key, by retrieving the memory address stored in said third field in the data segment of the displayed word, and wherein the said microprocessor means then fetches and displays the message stored in said memory address in said third memory means.

2. A device according to claim 1, wherein each of said data segments of said word files contains an additional field, wherein such field contains code for further explanatory abbreviations, and wherein said dot matrix display means contains further display area for said explanatory abbreviations.

3. A device according to claim 1, wherein one or more of said memory means and firmware means are stored in a removable random access memory means, wherein such removable memory means comprises a configuration directory, wherein said configuration directory comprises the base addresses of all of said tables, memories and files, and wherein said microprocessor means comprises firmware means to identify and decode said configuration directory.

4. A device according to claim 1 in which at least one of said languages is an Arabic language.

* * * * *